United States Patent
Lan et al.

(10) Patent No.: US 10,199,894 B2
(45) Date of Patent: Feb. 5, 2019

(54) ROTOR OF ELECTRIC MOTOR

(71) Applicant: INDUSTRIAL TECHNOLOGY RESEARCH INSTITUTE, Hsinchu (TW)

(72) Inventors: I-Wei Lan, Taoyuan (TW); Yu-Hsun Wu, Taipei (TW); Yee-Pien Yang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 348 days.

(21) Appl. No.: 14/978,451

(22) Filed: Dec. 22, 2015

(65) Prior Publication Data

US 2017/0163111 A1    Jun. 8, 2017

(30) Foreign Application Priority Data

Dec. 3, 2015   (TW) .............................. 104140571 A

(51) Int. Cl.
    *H02K 3/12*      (2006.01)
    *H02K 3/48*      (2006.01)
    *H02K 17/20*    (2006.01)

(52) U.S. Cl.
    CPC ................. *H02K 3/12* (2013.01); *H02K 3/48* (2013.01); *H02K 17/205* (2013.01)

(58) Field of Classification Search
    CPC .......... H02K 3/12; H02K 3/48; H02K 17/205; H02K 17/16; H02K 17/18; H02K 17/186

(Continued)

(56) References Cited

U.S. PATENT DOCUMENTS 3,902,087 A  *  8/1975   Hakamada ........... C08G 18/003
                                                                                    310/211
8,274,190 B2     9/2012   Alexander et al.
(Continued)

FOREIGN PATENT DOCUMENTS

CN       2896670 Y     5/2007
CN     102263466 A    11/2011
(Continued)

OTHER PUBLICATIONS

Francesco Parasiliti, et al., "IE3 Induction Motor designs with Aluminum and Copper Rotor Cage: Technical and Economic Comparison", Journal of Energy and Power Engineering 8, 2014, pp. 902-910.

(Continued)

*Primary Examiner* — Bernard Rojas
(74) *Attorney, Agent, or Firm* — Rabin & Berdo, P.C.

(57) ABSTRACT

A rotor of an electric motor including a rotor core, two conductive end plates, a plurality of conductors and a casting metal is provided. The rotor core has a central hole and a plurality of slots surrounding the central hole at a predetermined interval. The two conductive end plates, disposed at two ends of the rotor core, have a plurality of fixing structures, respectively. A plurality of cavities is disposed between two neighboring fixing structures and the shape and the positions of the cavities correspond to that of the slots. The conductors are shaped as long bars and penetrate the slots. Two ends of the conductors are fixed by the fixing structures. The casting metal is injected into the cavities and the slots, and further covers the peripheral of the conductors and the fixing structures, two ends of the rotor core and outside of the two conductive end plates.

12 Claims, 4 Drawing Sheets

(58) Field of Classification Search
USPC ......... 310/156.78, 156.79, 156.81, 211, 212, 310/156.53, 156.56; 29/598
See application file for complete search history.

(56) References Cited

U.S. PATENT DOCUMENTS

| | | | | |
|---|---|---|---|---|
| 8,720,041 | B2* | 5/2014 | Meyer | H02K 15/0012 29/596 |
| 8,963,394 | B2* | 2/2015 | Buttner | B22D 19/0054 310/211 |
| 2016/0164387 | A1* | 6/2016 | Komatsu | H02K 15/0012 310/211 |
| 2017/0257013 | A1* | 9/2017 | Weisheit | H02K 3/02 |

FOREIGN PATENT DOCUMENTS

| | | |
|---|---|---|
| CN | 102332802 A | 1/2012 |
| CN | 104769822 A | 7/2015 |
| CN | 104795912 A | 7/2015 |
| CN | 104871412 A | 8/2015 |
| JP | 2008-161024 A | 7/2008 |
| JP | 2009-296761 A | 12/2009 |
| KR | 2007-0101539 A | 10/2007 |
| TW | M445811 U | 1/2013 |
| TW | 201315097 A | 4/2013 |
| TW | M458028 U | 7/2013 |
| TW | 201526468 A | 7/2015 |
| TW | 201526469 A | 7/2015 |
| TW | 201541817 A | 11/2015 |

OTHER PUBLICATIONS

Xiaomin Lu, et al., "A Wavelet/PSO Based Voltage Regulation Scheme and Suitability Analysis of Copper and Aluminum-Rotor Induction Machines for Distributed Wind Power Generation", IEEE Transactions on Smart Grid, vol. 3, No. 4, Dec. 2012, pp. 1923-1934.

Francesco Parasiliti, et al., "New induction motor designs with Aluminum and Copper rotor specially developed to reach the IE3 efficiency level", University of L'Aquila, Department of Electrical and Information Engineering, Final Report, Jun. 2012, pp. 1-23.

Juergen F. Fuchslock, et al., "The Next Generation Motor", IEEE Industry Applications Magazine, Jan.-Feb. 2008, pp. 37-43.

I. Daut, et al., "Comparison of Copper Rotor Bars with Aluminium Rotor Bars Using FEM Software—A Performance Evaluation", 2009 Second International Conference on Computer and Electrical Engineering, IEEE Computer Society, pp. 456-459.

Khurshid Hafiz, et al., "Performance Analysis of Aluminum- and Copper-Rotor Induction Generators Considering Skin and Thermal Effects", IEEE Transactions on Industrial Electronics, vol. 57, No. 1, Jan. 2010, pp. 181-192.

Taiwanese Office Action dated Mar. 28, 2017.

* cited by examiner

ROTOR OF ELECTRIC MOTOR

This application claims the benefit of Taiwan application Serial No. 104140571, filed Dec. 3, 2015, the disclosure of which is incorporated by reference herein in its entirety.

TECHNICAL FIELD

The disclosure relates in general to an electric motor, and more particularly to a rotor of an electric motor.

BACKGROUND

The most commonly seen electric motor is mainly composed of a rotor and a stator winded with induction coils. The rotor can have many different types and can be formed of different materials. The most common type of the rotor includes copper rotor, aluminum rotor and squirrel-cage rotor. The squirrel-cage rotor generates an induced current through the conductors and is driven to rotate by the induced magnetic field.

Although the copper rotor has high rotor efficiency, the copper rotor is subject to problems such as difficulty in casting and high mold loss. Although the aluminum rotor is easier to cast, the aluminum rotor has higher resistance and higher loss. As for the squirrel-cage rotor, the soldering quality of conductors is unstable, and the casting process still have problems such as the flow of liquid metal being unsmooth, the distribution of the current being non-uniform, and the dynamic balance of the rotor being difficult to calibrate. Thus, how to provide a rotor having satisfactory efficiency and manufacturability and at the same time meeting the high quality requirement has become a prominent task for the industries.

SUMMARY

The present disclosure is directed to a rotor of an electric motor. Each conductor is electrically connected by the end plate disposed on at least one side of the rotor, and the conductor is fixed in the rotor core by the fixing structures of the end plate, such that at least one end of the conductor is fixed on the end plate, the casting metal further covers the two sides of the rotor, and the efficiency and the assembly quality of the rotor can be improved.

According to one embodiment of the present disclosure, a rotor of an electric motor including a rotor core, two conductive end plates, a plurality of conductors and a casting metal is provided. The rotor core has a central hole and a plurality of slots penetrating in the peripheral of the central hole, wherein the slots are disposed on the rotor core at a predetermined interval. The two conductive end plates are disposed at two ends of the rotor core respectively and have a plurality of fixing structures respectively. A plurality of cavities is disposed between two neighboring fixing structures respectively and the shape and the positions of the cavities correspond to that of the slots. The conductors are shaped as long bars and penetrate the slots. The two ends of the conductors are fixed by the fixing structures of the two conductive end plates respectively. The casting metal is injected into the cavities and the slots and further covers the peripheral of the conductors and the fixing structures, the two ends of the rotor core and the outside of the two conductive end plates.

According to another embodiment of the present disclosure, a rotor of an electric motor including a rotor core, a conductive end plate, a plurality of conductors and a casting metal is provided. The rotor core has a central hole and a plurality of slots surrounding the central hole, wherein the slots are disposed on the rotor core at a predetermined interval. The conductive end plate is disposed at one end of the rotor core, and has a plurality of fixing structures. A plurality of cavities is disposed between two neighboring fixing structures respectively, and the shape and the positions of the cavities correspond to that of the slots. The conductors are shaped as long bars and penetrate the slots. One end of the conductors is fixed by the fixing structures of the conductive end plates, and the other end of the conductors is fixed on the rotor core. The casting metal is injected into the cavities and the slots, and further covers the peripheral of the conductors and the fixing structures, the two ends of the rotor core and the outside of the conductive end plate.

The following description is made with reference to the accompanying drawings.

Figure 1:
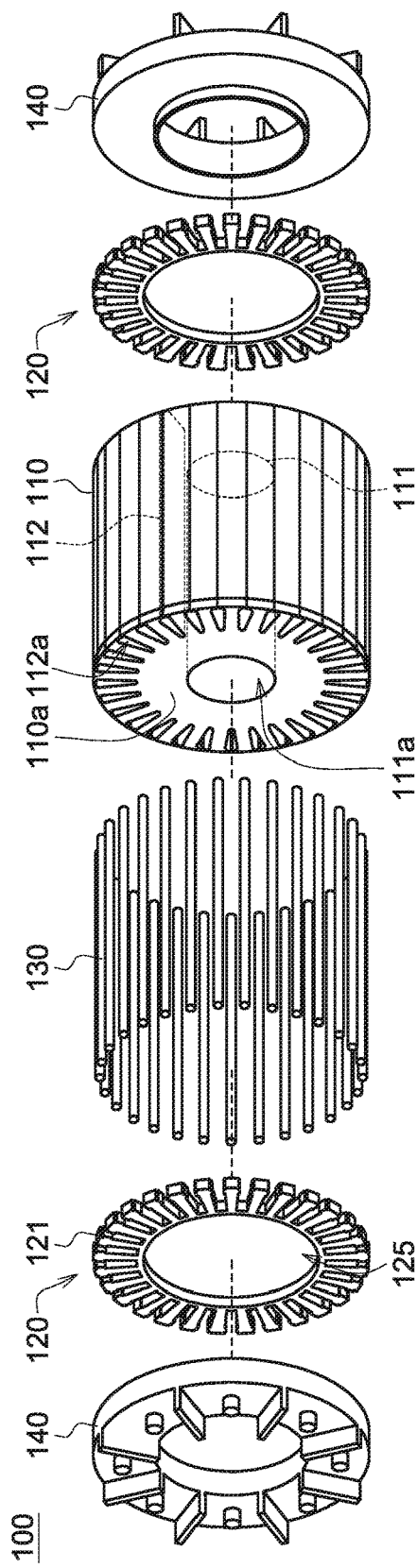
FIG. 1 shows an explosion diagram of a rotor of an electric motor according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A rotor of an electric motor is provided in an embodiment of the present disclosure. The rotor of the electric motor can be a squirrel-cage rotor whose conductors are formed of copper bars or aluminum bars. In general, the squirrel-cage rotor includes a rotor core and a plurality of conductors penetrating the rotor core. The rotor core is a cylinder composed of a plurality of stacked silicon steel plates whose outer diameters are identical. The induction coil wound on the stator generates a rotating magnetic field which drives the squirrel-cage rotor to rotate. When the rotating magnetic field of the stator coil is started up, the rotating magnetic field will cut the conductors of the squirrel-cage rotor and generate an induced current on the conductors. When the squirrel-cage rotor generates the induced current, the induced magnetic field of the squirrel-cage rotor will be generated at the same time, such that the squirrel-cage rotor will be driven by the rotating magnetic field and start to rotate.

According to the rotor of the present embodiment, the end plate disposed on at least one side of the rotor electrically couples to each conductor which is further fixed inside the rotor core by the fixing structure of the end plate, such that at least one end of each conductor is fixed on the end plate, and the casting metal further covers the two sides of the rotor to increase the efficiency and the assembly quality of the rotor.

Detailed descriptions of a rotor of an electric motor are disclosed below. However, the embodiments disclosed below are for explanatory and exemplary purposes only, not for limiting the scope of protection of the present disclosure.

Figure 2:
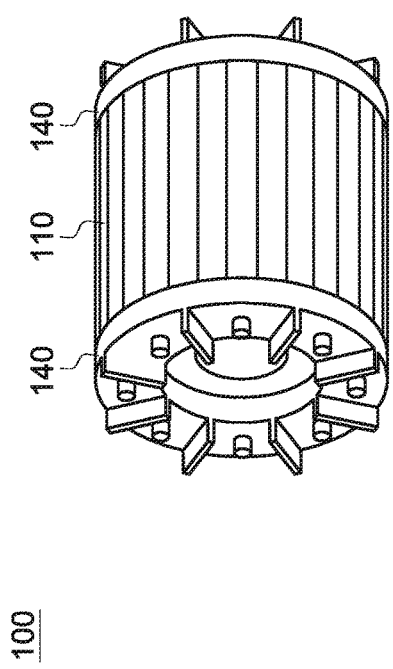
FIG. 2 shows an assembly diagram of a rotor of an electric motor according to an embodiment of the present disclosure.
Figure 5:
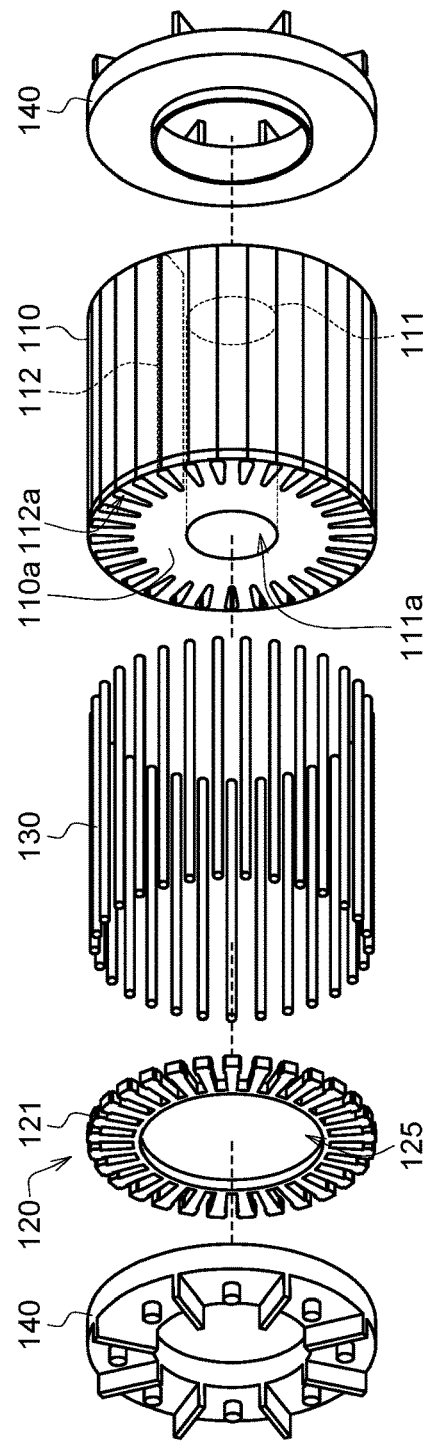
FIG. 5 shows an explosion diagram of a rotor of an electric motor according to another embodiment of the present disclosure.

Refer to FIGS. 1 and 2. FIG. 1 shows an explosion diagram of a rotor 100 of an electric motor according to an embodiment of the present disclosure. FIG. 2 shows an assembly diagram of a rotor 100 of an electric motor according to an embodiment of the present disclosure. The rotor 100 includes a rotor core 110, two conductive end plates 120 and a plurality of conductors 130 and a casting metal 140. In the present embodiment, the two ends of the conductors 130 are fixed by two conductive end plates 120. However, the present disclosure is not limited to the said exemplification. For example, as shown in FIG. 5, in another embodiment, one end of the conductor 130 can be fixed by one single conductive end plate 120, and the other end of the conductor 130 can be fixed on the rotor core 110 by the retaining structure or a solder structure; or, one end of the conductor 130 can be fixed on the rotor core 110 by way of extrusion deformation.

The rotor core 110 can be a cylinder composed of a plurality of silicon steel plates 110a (only one silicon steel plate is illustrated in the diagram). The rotor core 110 has a central hole 111 and a plurality of slots 112 penetrating in the peripheral of the central hole 111 and surrounding the cylinder. Each slot 112 is extended outwards in a radial direction from the peripheral of the central hole 111. The slots 112 are disposed on the rotor core 110 at a predetermined interval. In an embodiment, the spindle (not illustrated) of the electric motor can be fixed in the central hole 111 through a snap ring. Besides, the center of each silicon steel plate 110a has a first via 111a for forming the central hole 111 shaped as a long bar, and a plurality of second vias 112a for forming the slots 112 shaped as long bars are disposed in the peripheral of the first via 111a. The size and shape of the first vias 111a are identical to each other, and the size and shape of the second vias 112a are identical to each other.

Moreover, the two conductive end plates 120 are disposed at two ends of the rotor core 110, respectively. The conductive end plates 120 can be formed of copper or aluminum to increase the conductivity of the conductive end plates 120. The two conductive end plates 120 have a plurality of fixing structures 121 for fixing each conductor 130 in a corresponding slot 112.

The conductors 130 can be a copper rod or an aluminum rod, and shaped as a long bar penetrating a corresponding slot 112. Each slot 112 can be a fan-shaped hole. The outer diameter of the conductor 130 is slightly smaller than the outer width but slightly larger than the inner width of the slot 112, such that each conductor 130 can penetrate a corresponding slot 112, and the two ends of the conductor 130 can be fixed by the fixing structures 121 of the two conductive end plates 120.

Figure 3A:
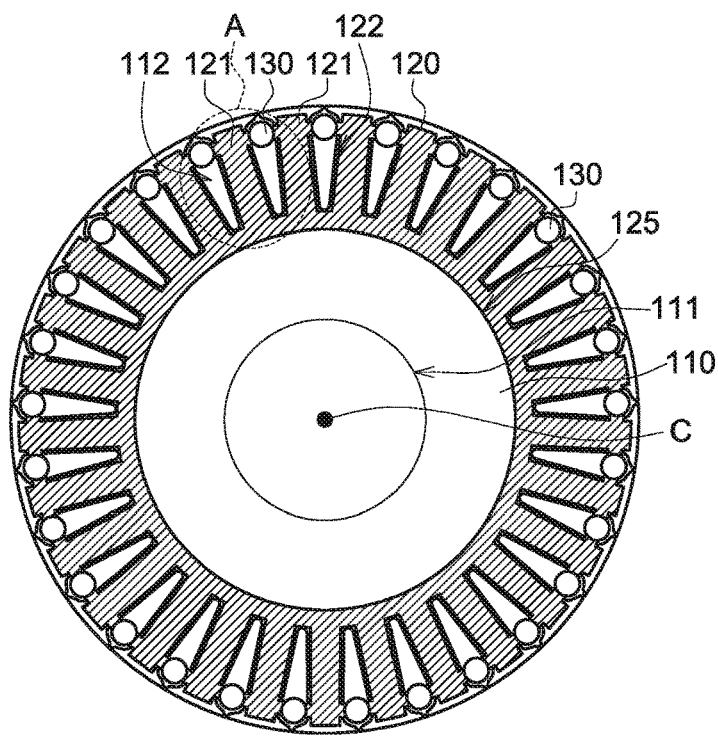
FIG. 3A shows a front view of a conductive end plate and a rotor core.
Figure 3B:
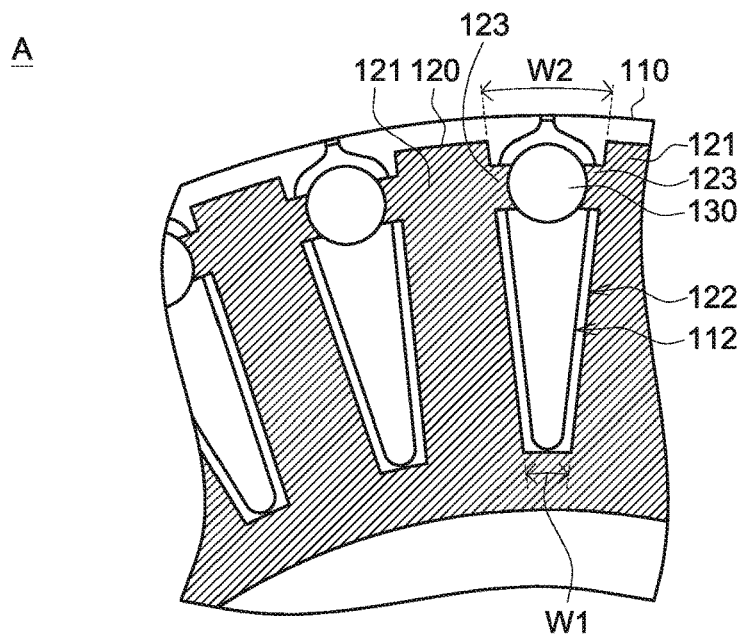
FIG. 3B shows a partial enlargement of a region A in FIG. 3A.

Refer to FIGS. 3A and 3B. FIG. 3A shows a front view of a conductive end plate 120 and a rotor core 100. FIG. 3B shows a partial enlargement of a region A in the FIG. 3A. As indicated in FIG. 3A, the rotor core 110 has a central hole 111, the center of the conductive end plate 120 has a hole 125, the diameter of the central hole 111 is smaller than the diameter of hole 125, and the central hole 111 and the hole 125 have the same central position C. Additionally, the fixing structures 121 are extended outwards along the radial direction from the peripheral of the hole 125, and a plurality of cavities 122 are disposed between two neighboring fixing structures 121, wherein the fixing structures 121 basically composed of cross-shaped sheets, and the shape and the positions of the cavities 122 correspond to that of slots 112. In an embodiment, each cavity 122 can be a fan-shaped hole whose inner width w1 is smaller than the outer width w2; the fixing position of the conductor 130 is close to the outside of the cavity 122, and the outer diameter of the conductor 130 is slightly smaller than the outer width w2 of the cavity 122.

Refer to FIG. 3B. Each slot 112 is exposed in a corresponding cavity 122 and slightly smaller than the corresponding cavity 122. For example, the ratio of the area of the cavity 122 to the area of the slot 11 is larger than 1.3, but the shape and size of each slot 112 correspond to that of the corresponding cavity 122, such that the casting metal 140 can be injected into the rotor core 110 in subsequent casting process and the generated pores will be reduced.

Refer to FIG. 3B. Two latches 123 are disposed oppositely on two neighboring lateral sides (long sides) of the fixing structures 121 and are protruded towards a corresponding cavity 122, such that each conductor 130 is engaged between the two latches 123. In an embodiment, the shape of the two latches 123 matches the shape of the conductor 130. For example, if the outer surface of the conductor 130 is a circle, each of the two latches 123 will have an indented surface matching the outer surface of the conductors 130, such that the conductors 130 can be engaged between the two latches 123 to reduce processing error. Moreover, after the conductor 130 is engaged between the two latches 123, the conductor 130 can further be fixed by way of soldering to enhance the structural strength. Also, the two conductive end plates 120 and the rotor core 110 can be fixed together by the latches or by way of soldering.

As indicated in FIG. 3B, the area of the conductor 130 is less than ¼ of the area of each slot 112, and most area of the slots 112 can be used as a space allowing the casting metal 140 to be injected into the rotor core 110. The fixing structures 121 not only fix the conductors 130, but further reduce the volume of the rotor 100. Thus, the casting metal 140 can be smoothly injected into the rotor core 110 and more amount of casting metal 140 can be injected to fill the slots 112.

Figure 4:
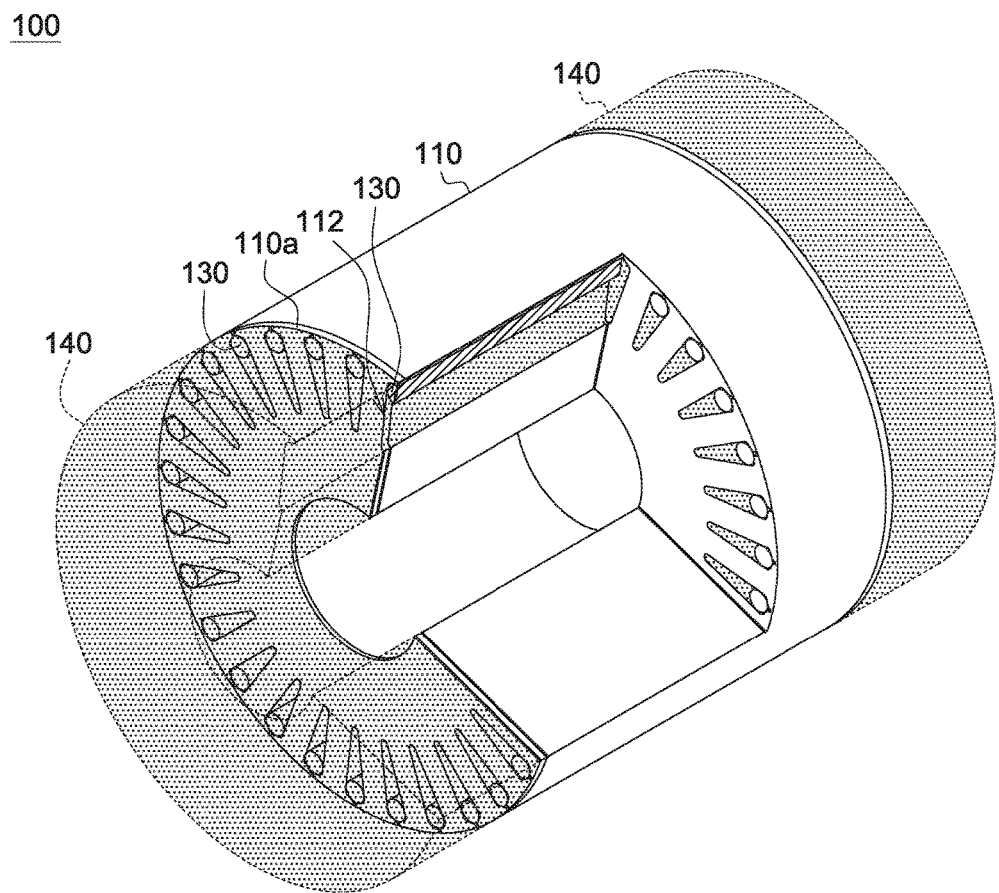
FIG. 4 shows a partial cross-sectional view of a casting metal inside a rotor.

Refer to FIGS. 3A, 3B and 4. FIG. 4 shows a partial cross-sectional view of a casting metal 140 injected into a rotor 100. After the two conductive end plates 120, the rotor core 110 and each conductor 130 are fixed, the liquid metal (such as liquid aluminum or liquid copper) is injected into the slots 112 of the rotor core 110 to form a casting metal 140 through a rotor injection process. The casting metal 140 is injected into the rotor core 110 and further covers the peripheral of each conductor 130 and the fixing structures 121. The casting metal 140 exposed outside can further cover the two ends of the rotor core 110 and the outside of two conductive end plates 120 to reinforce the overall structure of the rotor.

In an embodiment, details of the rotor injection process are disclosed below. Firstly, a rotor assembly is placed into a casting mold. Then, liquid metal is injected into the casting mold from one side of the casting mold and fills up the rotor through the slots 112 of the rotor core 110, and extra liquid metal is drained from the other side of the casting mold. Then, the casting mold is removed after the liquid metal cools and cures, and surface treatment and turning process are applied to the rotor to remove extra parts until the outer diameter of the rotor reaches a predetermined goal. Meanwhile, the two conductive end plates 120 on the two sides of the rotor 100 and each conductor 130 penetrating the rotor core 110 are covered and fixed by the casting metal 140 to complete the final rotor product.

According to the rotor of an electric motor disclosed in above embodiment of the present disclosure, the conductors of the rotor are fixed by the fixing structures, and the peripheral of the conductors has larger spaces, such that the casting metal can be uniformly injected into the rotor and the pores can be reduced. Besides, the two conductive end plates disposed on the two sides of the rotor (or the single conductive end plate disposed on one side of the rotor) have better conductivity and more stable quality than the conventional way implemented by solder fixing or aluminum ring, such that the efficiency of the rotor can be increased, and the dynamic balance of the rotor is easier to calibrate, and the current distribution of the conductors inside the magnetized rotor becomes more uniform.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A rotor of an electric motor, comprising:
   a rotor core having a central hole and a plurality of slots penetrating in the peripheral of the rotor core, wherein the slots are disposed on the rotor core at a predetermined interval;
   two conductive end plates disposed at two ends of the rotor core and having a plurality of fixing structures, wherein a plurality of cavities are disposed between two neighboring fixing structures respectively and shape and positions of the cavities correspond to shape and positions of the slots, wherein each of the slots and the cavities is a fan-shaped hole, outer widths of the cavities are larger than outer widths of the slots, and inner widths of the cavities are larger than inner widths of the slots;
   a plurality of conductors shaped as long bars and penetrating through the slots, wherein two ends of the conductors are fixed by the fixing structures of the two conductive end plates respectively, wherein outer diameters of the conductors are smaller than the outer widths of the slots and larger than the inner widths of the slots, the fixing structures extend outwards in a radial direction of the rotor core, and two corresponding latches oppositely disposed on two neighboring lateral sides of the fixing structures protrude towards a corresponding cavity, such that each of the conductors is engaged between the two corresponding latches; and
   a casting metal injected into the cavities and the slots, wherein the casting metal further covers the peripheral of the conductors and the fixing structures, two ends of the rotor core and outside of the two conductive end plates.

2. The rotor of an electric motor according to claim 1, wherein the rotor core is a cylinder composed of a plurality of stacked silicon steel plates whose outer diameters are identical to each other.

3. The rotor of an electric motor according to claim 2, wherein the center of each silicon steel plate has a first via for forming the central hole, and a plurality of second vias for forming the slots are disposed in the peripheral of the first via.

4. The rotor of an electric motor according to claim 1, wherein the slots are extended outwards in a radial direction from the peripheral of the central hole, and an inner width of the slots is relatively smaller than an outer width of the slots.

5. The rotor of an electric motor according to claim 1, wherein shapes of the two latches and the conductor engaged between the two latches are matched.

6. The rotor of an electric motor according to claim 1, wherein the two conductive end plates and the conductors are formed of copper or aluminum.

7. The rotor of an electric motor according to claim 1, wherein the casting metal is formed of liquid aluminum or liquid copper by way of casting.

8. A rotor of an electric motor, comprising:
   a rotor core having a central hole and a plurality of slots penetrating in the peripheral of the rotor core, wherein the slots are disposed on the rotor core at a predetermined interval;
   a conductive end plate disposed at one end of the rotor core and having a plurality of fixing structures, wherein a plurality of cavities are disposed between two neighboring fixing structures respectively and shape and positions of the cavities correspond to shape and positions of the slots, wherein each of the slots and the cavities is a fan-shaped hole, outer widths of the cavities are larger than outer widths of the slots, and inner widths of the cavities are larger than inner widths of the slots;
   a plurality of conductors shaped as long bars and penetrating the slots, wherein one end of the conductors is fixed by the fixing structures of the conductive end plate, and the other end of the conductors is fixed on the rotor core, wherein outer diameters of the conductors are smaller than the outer widths of the slots and larger than the inner widths of the slots, the fixing structures extend outwards in a radial direction of the rotor core, and two corresponding latches oppositely disposed on two neighboring lateral sides of the fixing structures protrude towards a corresponding cavity, such that each of the conductors is engaged between the two corresponding latches; and
   a casting metal injected into the cavities and the slots, wherein the casting metal further covers the peripheral of the conductors and the fixing structures, two ends of the rotor core and outside of the conductive end plate.

9. The rotor of an electric motor according to claim 8, wherein the rotor core is a cylinder composed of a plurality of stacked silicon steel plates whose outer diameters are identical to each other, and a center of each silicon steel plate has a first via for forming the central hole, and a plurality of second vias for forming the slots are disposed in the peripheral of the first via.

10. The rotor of an electric motor according to claim 8, wherein the slots are extended outwards in a radial direction from the peripheral of the central hole, an inner width of the slots is relatively smaller than an outer width of the slots.

11. The rotor of an electric motor according to claim 8, wherein shapes of the two latches and the conductor engaged between the two latches are matched.

12. The rotor of an electric motor according to claim 8, wherein the conductive end plate and the conductors are formed of copper or aluminum, and the casting metal is formed of liquid aluminum or liquid copper by way of casting.

* * * * *